(12) United States Patent
Gamache et al.

(10) Patent No.: US 9,909,843 B1
(45) Date of Patent: Mar. 6, 2018

(54) FRONT-FACING FLUOROPOLYMER-COATED ARMOR COMPOSITE

(71) Applicant: The United States of America, as represented by the Secretary of the Navy, Washington, DC (US)

(72) Inventors: Raymond M. Gamache, Prunedale, CA (US); Charles M. Roland, Waldorf, MD (US); Daniel M. Fragiadakis, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/479,053

(22) Filed: Apr. 4, 2017

Related U.S. Application Data

(60) Provisional application No. 62/445,325, filed on Jan. 12, 2017.

(51) Int. Cl.
*F41H 5/02* (2006.01)
*F41H 5/04* (2006.01)
(Continued)

(52) U.S. Cl.
CPC ......... *F41H 5/0457* (2013.01); *B32B 27/06* (2013.01); *B32B 27/322* (2013.01);
(Continued)

(58) Field of Classification Search
CPC ..... F41H 5/0457; B32B 27/06; B32B 27/322; B32B 2307/702; B32B 2307/72; B32B 2309/105; B32B 2571/02
(Continued)

(56) References Cited

U.S. PATENT DOCUMENTS

| | | | |
|---|---|---|---|
| 8,746,122 B1 * | 6/2014 | Roland | F41H 5/04 89/36.02 |
| 8,789,454 B1 * | 7/2014 | Roland | F41H 5/04 89/36.02 |

(Continued)

OTHER PUBLICATIONS

Ballistic Testing of Australian Bisalloy Steel for Armor Applications D.D. Showalter, W.A. Gooch, M.S. Burkins, V. Thorn, S.J. Cimpoeru and R. Barnett Jun. 2007, see p. 1 of report / p. 5 of enclosed document, section titled 'Introduction' (Year: 2007); establishes known hardness values for RHA and HHA.*

(Continued)

*Primary Examiner* — Samir Abdosh
(74) *Attorney, Agent, or Firm* — Naval Postgraduate School; James B. Potts

(57) ABSTRACT

A front-facing armor system utilizing a composite laminate backed by a high hardness substrate. The composite laminate comprises a series of first and second layers. The first layer of the bi-layer laminate system is a polymer with a density of at least 1.8 g/cm³ and having both an amorphous and crystalline phase, and having phase transformation pressure of at least 0.5 GPa at a temperature of 20° C. The second layer of each bi-layer provides acoustic impedance mismatch to generate reflections of the incident compression wave following ballistic impact. Under ballistic impact, the polymer comprising the armor system undergoes a shock-induced transition resulting in a marked change in microstructure and mechanical behavior, providing a significant kinetic energy absorption mechanism.

19 Claims, 10 Drawing Sheets

(51) Int. Cl.
*B32B 27/06* (2006.01)
*B32B 27/32* (2006.01)
(52) U.S. Cl.
CPC ..... *B32B 2307/702* (2013.01); *B32B 2307/72* (2013.01); *B32B 2309/105* (2013.01); *B32B 2571/02* (2013.01)
(58) Field of Classification Search
USPC ...................................................... 89/36.02
See application file for complete search history.

(56) References Cited

U.S. PATENT DOCUMENTS

2009/0068452 A1\* 3/2009 Sato ...................... B32B 38/004
428/336
2010/0282062 A1\* 11/2010 Sane ....................... F41H 5/007
89/36.02

OTHER PUBLICATIONS

Resnyansky et al. "Constitutive modeling of shock response of polytetrafluoroethylene," Journal of Applied Physics 110 (2011).
Resnyansky et al. "Constitutive modeling of shock response of PTFE," AIP Conference Proceedings 1195, 1183 (2009).
Roland et al, "Elastomer-steel laminate armor," Composite Structures 92 (2010).
Bourne et al., "Equation of state of polytetrafluoroethylene," Journal of Applied Physics 93(11) 2003.
Bogoslovov et al., "Impact-induced glass transition in elastomeric coatings," Applied Physics Letters 90 (2007).
Nagao et al., "Nanosecond time-resolved Raman spectroscopy on phase transition of polytetrafluoroethylene under laser-driven shock compression," Applied Physics Letters 83(2) 2003.
Bourne et al.,"On compression and damage evolution in two thermoplastics," Proc. R. Soc. A 473 (2016).
Marega et al., "Relationship between the Size of the Latex Beads and the Solid-Solid Phase Transitions in Emulsion Polymerized Poly(tetrafluoroethylene)," Macromolecules 37 (2004).
Bourne et al.,"Shock, release and Taylor impact of the semicrystalline thermoplastic polytetrafluoroethylene," Journal of Applied Physics 103 (2008).
Feng et al., "The Effect of Crystallinity on Compressive Properties of Al-PTFE," Polymers 8 (2016).
Rae et al., "The properties of poly(tetrafluoroethylene) (PTFE) in compression," Polymer 45 (2004).
Rozner et al.,"Composite Sheilds," H1061, Jun. 2, 1992.
Gamache et al., "Elastomer-metal laminate armor," Materials and Design 111 (2016).
Wecker et al., "Preferred orientation of crystallites in uniaxially deformed polytetrafluoroethylene," Journal of Applied Physics 43 (1972).
Rae et al., "The properties of poly(tetrafluoroethylene) (PTFE) in tension," Polymer 46 (2005).
Sorensen et al., "High-Velocity Impact of Encased Al/PTFE Projectiles on Structural Aluminum Armor," Procedia Engineering 103 (2015).

\* cited by examiner

FRONT-FACING FLUOROPOLYMER-COATED ARMOR COMPOSITE

RELATION TO OTHER APPLICATIONS

This patent application claims the benefit of U.S. Provisional Application No. 62/445,325 filed Jan. 12, 2017, which is hereby incorporated in its entirety.

FIELD OF THE INVENTION

One or more embodiments relates to an armor system for the mitigation of a ballistic impact.

BACKGROUND

The next generation of armor must exhibit exceptional ballistic penetration resistance, reduced weight, and low production costs. Emerging armor composites must address threats from fragmentation and small arms fire. Subsequently, novel armor composites must find an optimal balance between penetration resistance performance and minimum areal densities.

Several recent approaches have incorporated both monolithic and composite layers of polymer or polymer/metal coatings on the front surfaces of high hard steel (HHS) armor plates. Different configurations, such as Dragonshield armor, have improved ballistic penetration resistance of high hard steel (HHS) by 40% with only a 23% increase in areal density. The front-facing polymer coating configuration is inexpensive and can be retrofit onto armor plates that exhibit required hardness and toughness. The coating relies on an impact-induced glass phase transition ($T_g$) to absorb energy, harden the coating, and reduce the strain imparted to the substrate. This effect has been exploited with other polymer coatings (e.g., butyl rubber,), which also exhibit a viscoelastic phase transition under high strain rate impact. Furthermore, laminates in the form of physically separate layers of polymer/metal stiffen the rubber material, create an impedance mismatch between the layers, and improve the mass efficiencies of armor.

In polymer-comprising armor systems, the nature of the interaction and the effect of impact depend strongly on the properties of both target and projectile. The origin of the blast and ballistic mitigation from many polymer and rubber coatings remains to be fully understood, with a variety of mechanisms likely contributing. The viscoelastic nature of polymers means that the frequency and test temperature can influence the properties of polymer-based ballistic armor, and the convolution of rate and strain effects makes quantitative analysis difficult. One important aspect of performance is the frequency of the segmental dynamics of the polymer in comparison to the strain rate during the loading. For ballistics the latter can be as high as $10^5$ s$^{-1}$ or more, and reorientation and translational modes of the polymer segments are too slow to respond on the available timescale. It would be advantageous to provide an armor system comprising a polymer where large energy absorptions could occur via solid-solid phase transitions of sufficient rapidity to mitigate impacts over the rapid timescale of a ballistic event.

These and other objects, aspects, and advantages of the present disclosure will become better understood with reference to the accompanying description and claims.

SUMMARY

The disclosure provides an armor system utilizing a composite laminate backed by a high hardness substrate. The composite laminate comprises a plurality of bi-layers, with each bi-layer comprising a first and second layer. The first layer is a polymer having a density of at least 1.8 g/cm$^3$ and possessing both an amorphous phase and a crystalline phase, with the percent crystallinity from about 55% to about 85%. Additionally, the polymer has a phase transformation pressure between the existing crystalline phase and a second crystalline phase of at least 0.5 gigapascals (GPa) at a temperature of 20° C. The second layer has an acoustic or shock impedance greater than an acoustic impedance of the first layer, in order to generate reflections of an incident compression wave following a ballistic impact. In a typical embodiment the second layer comprises a metal such as aluminum.

The plurality of bi-layers are stacked to form the composite laminate with typically each bi-layer fixably attached to at least one other bi-layer. The substrate backing the composite laminate is a high hardness material, such as those generally known as High-Hardness Steel (HHS) or Ultra-High-Hardness Steel (UHHS). Additionally, the armor system comprises a strike face and a back-face relative to an expected incoming ballistic projectile. The composite laminate comprise the strike face and the substrate comprises the back-face, such that the composite laminate is front facing with the composite laminate between the substrate and the strike face of the armor system. The composite laminate may comprise additional layers, such as adhesive between the first and second layer or between successive bi-layers. In certain embodiments, the polymer comprises a fluorinated polymer, and in other embodiments, the polymer comprises polytetrafluoroethylene (PTFE).

The pressure induced transition properties of the polymer utilized generate a significantly different response to ballistic impact compared to the typical elastomeric polymers utilized in front-facing, monolithic and laminate type systems. With the armor disclosed and comprising a polymer having a phase transformation pressure of at least 0.5 GPa at a temperature of 20° C., ballistic impact under typical operating conditions results in a phase transformation of an existing crystal phase into a subsequent, different crystal phase, which acts to harden the impact zone, resist material flow, and reduce imparted strain. The phase transition occurs over time scales sufficiently rapid to act during typical ballistic impact time frames. This rapid phase transition under ballistic impact represents a significantly different mode of response versus the typical elastomeric polymers utilized in front-facing, laminate-type armor systems.

The novel apparatus and principles of operation are further discussed in the following description.

Figure 1:
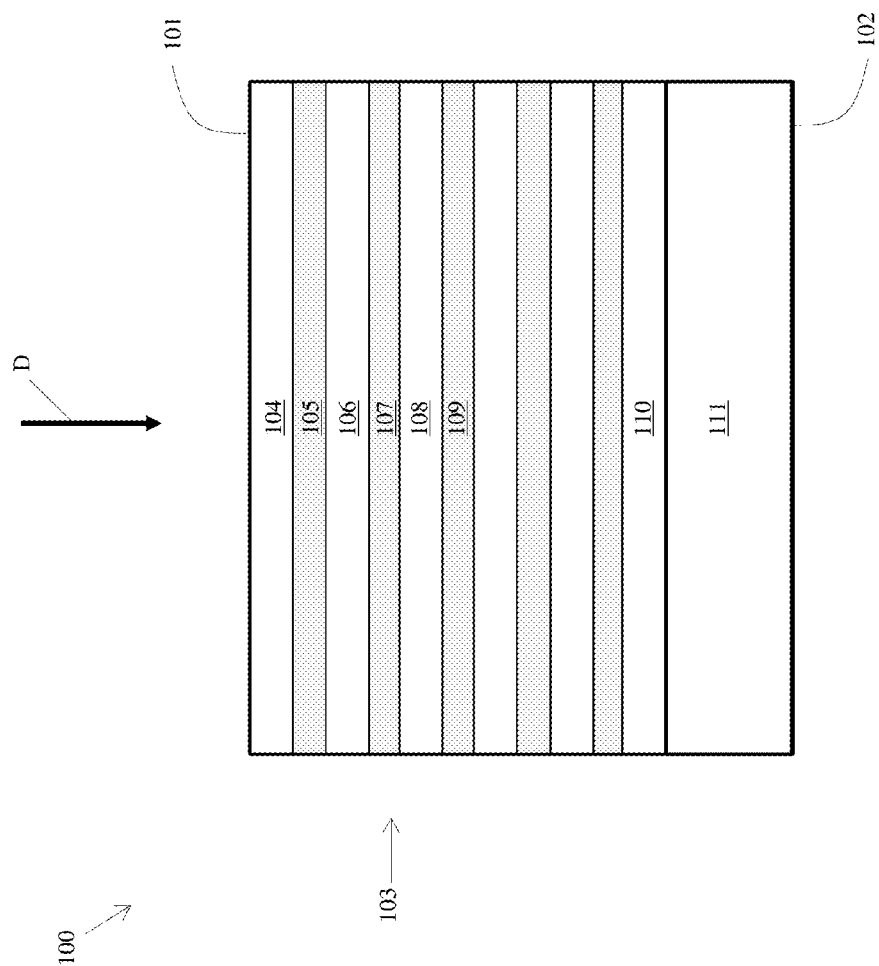
FIG. 1 illustrates a particular embodiment of the armor system disclosed.

Embodiments in accordance with the invention are further described herein with reference to the drawings.

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide an armor system comprising a composite laminate comprising a plurality of polymer layers having a pressure-induced solid-solid transition between crystalline states.

The armor system disclosed utilizes a composite laminate comprising a plurality of bi-layers backed by a high hardness substrate. Each bi-layer in the laminate comprises a first and second layer, with the second layer typically fixably attached to the first layer. The first layer of the polymer bi-layer system has a density of at least 1.8 g/cm$^3$ and possesses both an amorphous phase and a crystalline phase, with the percent crystallinity from about 55% to about 85%. Further and significantly, the polymer has a phase transformation pressure between the existing crystalline phase and a second crystalline phase of at least 0.5 GPa at a temperature of 20° C. An exemplary polymer meeting these characteristics is polytetrafluoroethylene (PTFE). The second layer of each bi-layer has an impedance greater than an impedance of the first layer, in order to generate reflections of an incident compression wave following a ballistic impact. Here, "impedance" means either acoustic impedance or shock impedance, as those terms are used in the art. See e.g. G. Ben-Dor, O. Igra, & T. Elperin, eds., *Handbook of Shockwaves* (2001). In a typical embodiment the second layer comprises a metal, such as aluminum (Al). The plurality of bi-layers are stacked to form the composite laminate such that typically each bi-layer is fixably attached to at least one other bi-layer in the plurality, and the composite laminate comprising the stacked bi-layers is backed by a substrate comprising a high hardness material, such as those generally known as High-Hardness Steel (HHS) or Ultra-High-Hardness Steel (UHHS). Additionally, the armor system is intended to comprise a strike face and a back-face relative to an incoming ballistic projectile, with the composite laminate comprising the strike face and the substrate comprising the back-face, such that the composite laminate is front facing. Further, the plurality of bi-layers is arranged such that a projectile moving toward the strike face impacts the first layer of each double layer before impacting the second layer. Stated equivalently, the plurality of bi-layers is arranged within the composite laminate such that the first layer of each bi-layer is between the second layer of the bi-layer and the strike face of the armor system, and the composite laminate is between the substrate and the strike face. The composite laminate may comprise additional layers, such as adhesive between the first and second layer or between successive bi-layers.

The pressure induced transition properties of the polymer utilized in the disclosed system generate a significantly different response to ballistic impact compared to the typical elastomeric polymers utilized in front-facing, laminate type systems. As is understood, in some systems, elastomeric polymers can experience an impact-induced glass transition, where reorientation and translational modes of the polymer segments are too slow to respond on the available timescale and the high segmental dynamics experienced generate a transition of the rubbery polymer to a glassy state. This generates brittle fracture of the material accompanied by large energy absorption. See e.g. Roland et al., "Elastomer-steel laminate armor," *Composite Structures* 92(5) (2010); see also Bogoslovov et al., "Impact-induced glass transition in elastomeric coatings," *Applied Physics Letters* 90 (2007). In contrast, with a polymer such as PTFE and its associated phase transformation pressure of at least 0.5 GPa at a temperature of 20° C., ballistic impact under typical operating conditions results in a phase transformation of an existing crystal phase into a subsequent, different crystal phase, which acts to harden the impact zone, resist material flow, and reduce imparted strain. In materials such as PTFE under impact conditions, the phase transition can occur over time scales on the order of 10 nanoseconds and is sufficiently rapid to act during typical ballistic impact time frames. See e.g. Nagao et al., "Nanosecond time-resolved Raman spectroscopy on phase transition of polytetrafluoroethylene under laser-driven shock compression," *Applied Physics Letters* 83 (2003). This rapid phase transition under ballistic impact represents a significantly different mode of response for a polymer such as PTFE versus the typical elastomeric polymers utilized in front-facing, laminate-type armor systems.

A typical embodiment of the armor system disclosed is illustrated at FIG. 1 as armor system 100. Armor system 100 is intended to mitigate impact coming generally from the direction indicated by D, and consequently comprises strike face 101 and back-face 102. Armor system 100 includes a composite laminate generally indicated by 103. Composite laminate 103 comprises strike face 101, and further comprises a plurality of bi-layers where each bi-layer comprises a first layer and a second layer. For example at FIG. 1, first layer 104 and second layer 105 comprise a first bi-layer, first layer 106 and second layer 107 comprise a second bi-layer, and first layer 108 and second layer 109 comprise a subsequent bi-layer. In each bi-layer, the first layer is between the second layer and strike face 101. Additionally, the first layer has a first impedance and the second layer has a second impedance, where the second impedance is greater than the first impedance and where, as stated impedance refers to either acoustic impedance or shock impedance. In a particular embodiment, the second impedance of the second layer exceeds the first impedance of the first layer such that $Z_1/Z_2<0.5$, where $Z_1$ is the first impedance and $Z_2$ is the second impedance, and where $Z_1$ and $Z_2$ are both either an acoustic impedance or a shock impedance of the first and second layers respectively. Stated equivalently, $Z_2$ is the acoustic impedance of the second layer if $Z_1$ is the acoustic impedance of the first layer, and $Z_2$ is the shock impedance of the second layer if $Z_1$ is the shock impedance of the first layer.

The bi-layers are arranged within composite laminate 103 such that a projectile moving toward strike face 103 will impact the first layer before impacting the second layer. For example, at FIG. 1, the first bi-layer comprising first layer 104 and second layer 105, the second bi-layer comprising first layer 106 and second layer 107, and the subsequent bi-layer comprising first layer 108 and second layer 109 are all arranged such that a projectile having a direction D will impact the first layer of the respective bi-layer prior to the second layer. Composite laminate 103 may also comprise additional layers, such as adhesive layers between successive first and second layers and between successive bi-layers, and may comprise additional layers not strictly belonging within a bi-layer as defined, such as additional layer 110 at FIG. 1. In a typical embodiment, each bi-layer is fixably attached to at least one other bi-layer in composite laminate 103, and in another embodiment, the second layer of each bi-layer is fixably attached to a first layer comprising another bi-layer. The various components may be fixably attached using any means known in the art, such as adhesives, clamping, alternate fastening means, and others.

As discussed, the first layer of each bi-layer comprises a polymer having a density of at least 1.8 g/cm$^3$. In some embodiments, the polymer is a fluorinated polymer comprising carbon-fluorine bonds, and in a further embodiment, the fluorinated polymer comprises PTFE or comprises a homologue or derivative of PFTE. The polymer comprises an amorphous phase and a crystalline phase, and possesses a percent crystallinity of greater than 55% and less than 85%. Crystallinity may be determined using means known in the art, such manufacturer specifications, reference tables, or known evaluation techniques such as X-ray Powder Diffraction (XRD). See e.g. C. De Rosa and F. Auriemma, *Crystallinity in Polymers: Diffraction Analysis of Ordered and Disordered Crystals* (2014), among many others. In some embodiments the polymer has a density of at least 2 g/cm$^3$, and in other embodiments has a percent crystallinity from about 60% to about 80%. Additionally, the polymer has a phase transformation pressure between the crystalline phase and a second crystalline phase of at least 0.5 GPa at a temperature of 20° C. In some embodiments, the phase transformation is greater than 0.6 GPa at 20° C., and in other embodiments, greater than 0.65 GPa at 20° C.

Figure 2:
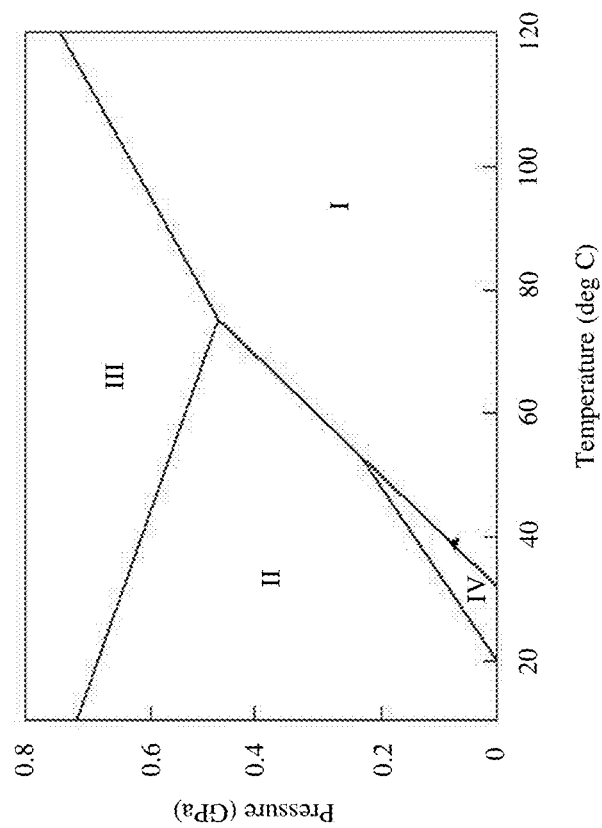
FIG. 2 illustrates a phase diagram for polytetrafluoroethylene.

As an example of an applicable phase transformation pressure, FIG. 2 illustrates a phase diagram for the exemplary fluorinated polymer PTFE which illustrates pressure and temperature conditions of various expected phases, including a pseudohexagonal crystal in region I, a triclinic crystal in region II, an orthorhombic crystal in region III, and a hexagonal crystal in region IV. See e.g., Rae et al., "The properties of poly(tetrafluoroethylene) (PTFE) in compression," *Polymer* 45 (2004), among others. As illustrated, PTFE is expected to have a phase transition from region II to region III at a pressure of about 0.65 GPa at a temperature of about 20° C. Generally, the polymer undergoes a crystalline solid-solid transition where a first crystalline solid comprising the polymer is transformed into another crystalline solid without entering an isotropic liquid phase. These transitions result in material polymorphs and typically encompass first-order transitions with discontinuous changes in volume, enthalpy, and entropy due to crystal packing changes. See e.g., S. Cheng, *Phase Transitions in Polymers: The Role of Metastable States* (2008), among others. In a particular embodiment, the polymer having a phase transition similar to that of FIG. 2 comprises at least 50 weight percent (wt. %), at least 75 wt. % or at least 90 wt. % of the first layer. In another embodiment, the polymer comprises a fluorinated polymer and the fluorinated polymer comprises at least 50 wt. %, at least 75 wt. % or at least 90 wt. % of the polymer comprising the first layer. In further embodiments, PTFE comprises at least 50 wt. %, at least 75 wt. % or at least 90 wt. % of the fluorinated polymer. In an additional embodiment, PTFE comprises at least 50 wt. %, at least 75 wt. % or at least 90 wt. % of the first layer.

Without being bound by theory, when armor system 100 experiences a ballistic impact on strike face 101, the polymer comprising the first layer undergoes a shock-induced transition resulting in a marked change in microstructure and mechanical behavior. In fluorinated polymers such as PTFE under shock-induced loading, the increase in pressure stimulates transfer of the material into hard crystalline phase. Moduli are observed to increase and crystallinity increases as the material transitions through the borderlines approximated by the known phase diagrams. See e.g. Bourne et al., "Equation of state of polytetrafluoroethylene," *Journal of Applied Physics* 93(11) (2003); see also Resnyansky et al., "Constitutive Modeling of Shock Response of polytetrafluoroethylene," *Journal of Applied Physics* 110 (2011); see also Bourne et al., "On compression and damage evolution in two thermoplastics," *Proc. R. Soc. A* 473 (2016). As discussed, the phase transition can occur over time scales on the order of 10 nanoseconds and be sufficiently rapid to act during typical ballistic impact time frames. See e.g. Nagao et al., *Applied Physics Letters* 83 (2003). The nondeformed structure in ambient conditions typically features crystalline phases (phase II triclinic) that are surrounded by amorphous domains. During amorphization, PTFE fibers unravel and adopt, initially, a helical conformation, and, subsequently, further rotate and untwist to assume a hexagonal structure. Under mechanical stress, the amorphous regions orientate along the tensile stress directions (and are responsible for any viscoelastic flow) and the crystalline regions exhibit slip dislocations (i.e., they account for plastic deformation and stress-hardening). During compression-induced deformation, PTFE's structural changes (amorphous and crystalline regions rearrange) absorb much more impacted energy (>30%) than rigid metals (<10%). The polymer demonstrates high strain hardening, yet it is not brittle. Since this polymer has very high viscosity (1.7 P·s at 25° C.), its plastic deformation and shock-induced flow are very energy-intensive processes, generating a kinetic energy absorption mechanism which outperforms the kinetic impact resistance of polyurea and similar elastomers.

The presence of crystalline and amorphous phases in the armor system disclosed also provides additional advantages in a ballistic impact. In many fluorinated polymers, there are typically significant differences in the size and shape of the crystalline domains based on processing, forming geometries, and other fabrication variables. For PTFE, there is a small density difference between prevailing crystalline and amorphous phases and more significantly, a large modulus mismatch. The moduli within a PTFE chain vary from 6 GPa between the chains up to to 220 GPa in the crystalline phase and down to 0.3 GPa in the amorphous phase. Coupled with the density differences, the variation in bulk sound speed can generate large impedance mismatches between the crystalline and amorphous domains, leading to a nonuniform shock front. Further, it has been shown under static plane strain loading that individual crystalline domains transform over a range of loading states when the loading component parallel to the polymer chain reaches the critical level. In the plane strain condition of the shock, it can be expected that the time and extent of transformation will be dependent on crystalline domain orientation relative to the shock. The volume reduction that occurs on reordering may be sufficient to allow nucleation of cracks within tensile regions. See e.g. Bourne et al., "Shock, release and Taylor impact of the semicrystalline thermoplastic polytetrafluoroethylene," *Journal of Applied Physics* 103 (2008). Correspondingly, the semicrystalline nature of the polymer likely has a role in the response of the disclosed armor system under ballistic impacts.

As discussed for the bi-layer laminate system, the second layers such as 105, 107, and 109 comprises a material having an impedance greater than the corresponding first layers. The impedance mismatch creates multiple reflections of the incident compression wave as it transmits in front of a projectile during a ballistic event. In a particular embodiment the second layer comprises a metal such as aluminum, iron, steel, or others. In some embodiments, the second layer comprises a metal foil comprising, for example, aluminum, iron, steel, or other metals, including any alloys or composites of such metals.

As discussed, substrate 111 is a high hardness material, such as those generally known as High-Hardness Steel (HHS) or Ultra-High-Hardness Steel (UHHS). In typical embodiments, substrate 111 has a Brinell hardness of greater than 400 BHN, in other embodiments greater than 500 BHN, and in other embodiments greater than 600 BHN. Appropriate hardness generally depends on the ballistic threat expected. Brinell hardness may be determined using means known in the art, such as ASTM E10-14 and ISO 6506-1: 2005. In some embodiments substrate 111 is an alloy of iron and carbon, and in another embodiments, substrate 111 comprises iron as a majority constituent such that iron comprises at least 50 wt. % of substrate 111.

In a typical embodiment, the first layer has a thickness of greater than 0.2 mm and less than 2.5 mm. In another embodiment, the second layer has a thickness of greater than 0.01 mm and less than 0.6 mm. In a further embodiment, the substrate has a thickness of greater than 2 mm. In an additional embodiment, the composite laminate comprises at least three bi-layers. Generally, good surface contact among the first layers, second layers, successive bi-layers, the substrate, and/or any other intervening layers is important for good ballistic resistance.

Additionally, it is understood that, as used here, the term "strike-face" connotes a face or surface of the disclosed armor system intended to be oriented toward an impact source prior to impact, and that "back-face" connotes a face other than the strike face and separated from the impact source by the strike face, and that the use of these terms in this disclosure is not intended to preclude use of the disclosed armor system as an individual component in a larger armor system comprising other components.

Exemplary Embodiments:

In one embodiment, the fluorinated polymer was PTFE with a density of 2.2 g/cm$^3$, 300% elongation, and 0.55 GPa modulus. PTFE resists corrosion, is an electronic insulator, and is chemically stable. Additionally, PTFE is semicrystalline, with a glass transition temperature (115° C.) that is higher than the $T_g$ of similar elastomers. Its non-deformed structure typically features crystalline phases (phase II triclinic) that are surrounded by amorphous domains.

These results examine the influence of PTFE layer thicknesses and laminate structures on the impact resistance using Mil Std 46100 HHS and UHHS (~600 Brinell hardness) armor plates against 0.50 caliber fragment simulating projectile (FSP) projectiles. The ballistic studies applied varied PTFE monoliths and laminates on the strike face of high hard armor substrates. The results focus on V-50 penetration resistance performance as a function of coating/laminate configurations.

Ballistic Testing

Ballistic testing was carried out at the Naval Surface Warfare Center Dahlgren Division (NSWCDD) following Mil-Std-662F. Targets were mounted upright with a 15 meter standoff from a rifled 0.50 caliber Mann barrel. All testing incorporated 0.50 caliber fragment simulating projectiles (FSPs) with varied incident velocities between 600 and 1400 m/s. The propellant mass was varied for each FSP shot to control the impact velocity. Impact velocities were measured using two independent velocimeter systems. Each of the two velocity measurement system incorporated two Ohler model 57 velocity screens (~1 meter separation) with high speed data acquisition (5 MS/s). The velocimeter pairs shared the same center point that recorded identical velocity measurements of the projectile and eliminated any range errors. A remotely controlled target holder system was used to both hold the target coupon and align impact positions on the PTFE armor systems (Mann barrel was rigidly mounted). A 0.5 mm thick 2024 Al witness panel was placed 15.2 cm behind the back side of the armor panel and recorded full (FP) or partial (PP) penetration of each impact. All v-50 results were determined using Mil-Std-662F.

Mass efficiency calculations compared the selected PTFE coating systems and backing substrates against rolled homogeneous armor (RHA): the areal densities of RHA, to stop a specific projectile and velocity, were divided by the areal density of the PTFE composite armor system. In addition to the mass efficiency, the coating isolated performance (CIP) was additionally calculated to understand the contribution of the PTFE coatings. The CIP was determined through the following:

$$\mathrm{CIP} = (V50_{coating+substrate} - V50_{Substrate})/\text{coating thickness}$$

where $V50_{coating+substrate}$ is the V-50 of the complete armor system and $V50_{substrate}$ is V-50 performance of the steel substrate alone without a coating and the coating thickness is the combined PTFE thickness. Additional ballistic tests derived the baseline V-50 values for each uncoated steel substrate that was incorporated within this test series.

Performance of Monolithic PTFE Coatings

Single-layer (monolithic) polytetrafluoroethylene (PTFE) layers, which were coated with perfluorooctanoic acid (PFOA) as an adhesion promoter, adhered to the steel substrates using ultrahigh strength (506% elongation, 9.7 MPa modulus) handmix polyurea elastomer (HMVK; SPI) as an adhesive.

Two different thicknesses of HHS substrates (Mil-Std-46100) were used for each single-layer PTFE coating: 4.76 mm and 6.33 mm. The Brinell hardness of each substrate ranged between 470 and 490 Brinell. The single PTFE layer thickness varied between 2.3 mm and 19.7 mm. The HHS substrates were sandblasted and featured 2-3 mm profiles to enhance polymer adhesion to the steel. Each target was cut into a square shape that was 30.5 cm long by 30.5 cm wide.

Figure 3:
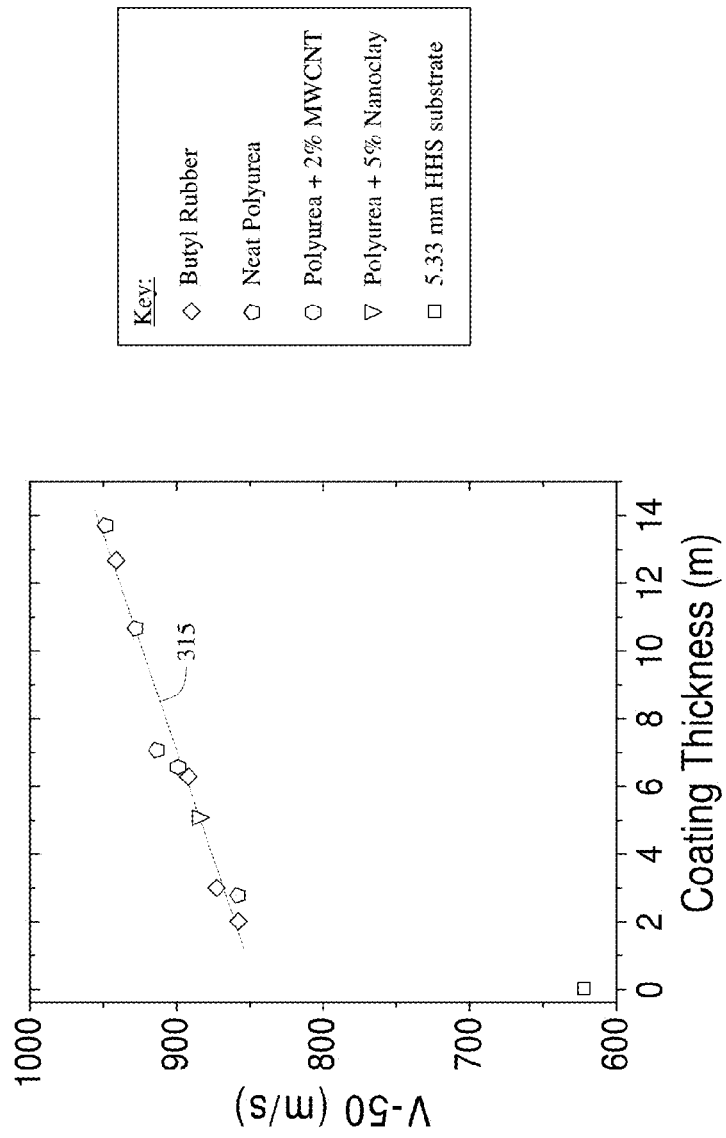
FIG. 3 illustrates V-50 versus thickness for several materials.

Since the monolithic PTFE layers were applied to rigid HHS substrates of standard thicknesses, the efficacy of this coating can be directly compared against previously reported coated polymers with low $T_g$. A collection of V-50 values for various coatings is shown in FIG. 3. In agreement with previous reports, front-facing polymer coatings (including polyurea and other rubbers) substantially improved the penetration resistance of HHS. After a very steep increase in V-50, beyond ca. 2-3 mm, each mm of polymer layer (including polyurea) backed by a 5.33 mm thick HHS substrate increased the V-50 penetration resistance performance by 7.7 m/s. Neither the specific polymer (polyurea vs. butyl rubber) nor any additives (such as clay or MWCNT)

significantly altered this linear behavior. The trend line 315 indicates a slope of about 7.7 (m/s)/mm.

Figure 4:
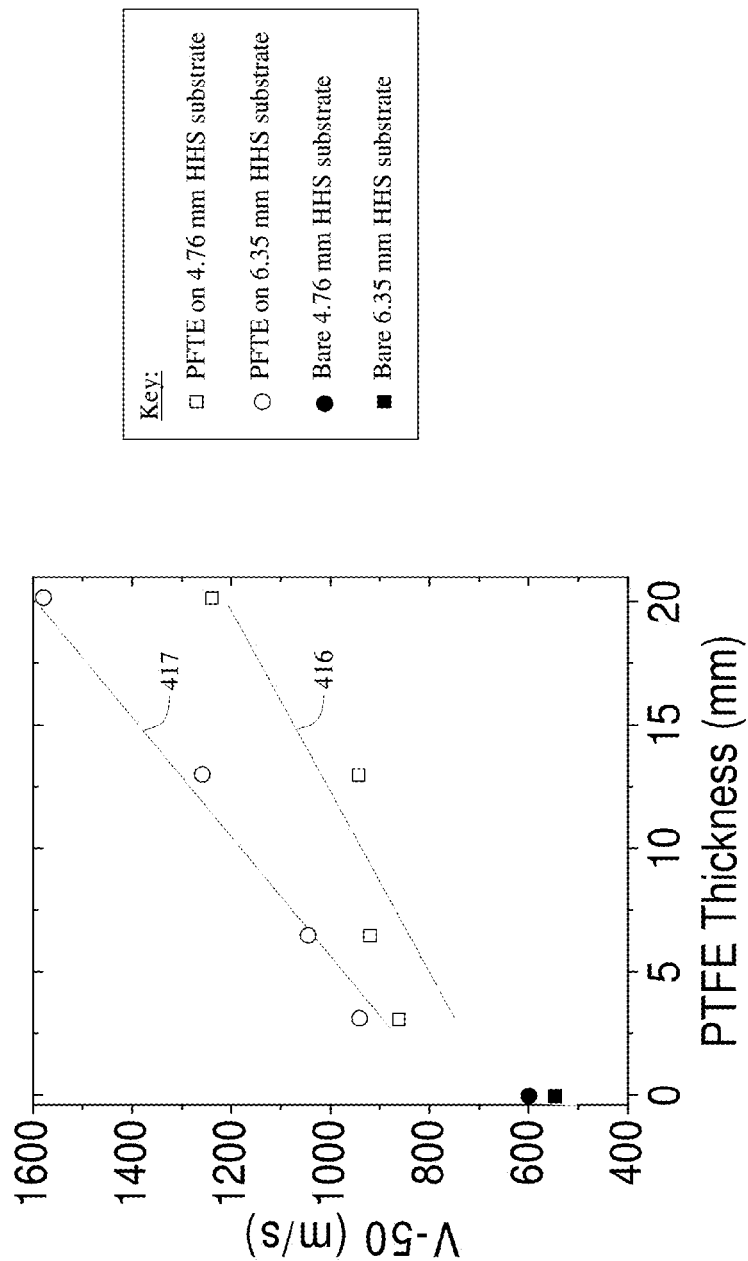
FIG. 4 illustrates V-50 versus thickness for selected embodiments of the armor system.

FIG. 4 shows the V-50 vs. coating thickness relationship of monolithic PTFE polymer layers on 4.76 and 6.33 mm thick HHS substrates. Even the thinnest layers (2 mm) increased V-50 of the rigid substrate by 55% (for 4.76 mm HHS) to 80% (6.33 mm HHS). Greater PTFE layer thicknesses yielded linear increases in the V-50 of the coated samples. While this behavior resembled the trend of previously tested polyurea and rubber front-facing layers, the fluorinated polymer coating produced significantly greater marginal V-50 increases. With each mm of PTFE, the V-50 increased by 21.4 and 22.6 m/s for, respectively, 4.76 and 6.33 mm thick HHS, as indicated by trend lines 416 and 417 respectively. This represented a threefold increase in the marginal benefit of fluorinated polymer coatings over all previously reported coated HHS substrates. PTFE's high crystallinity and a relatively high viscosity may minimize its flow and retain more material within the impact area. This, subsequently, enables a reduced strain rate for the ballistic impact as well as an increase in the impact area of the incident projectile.

Figure 5:
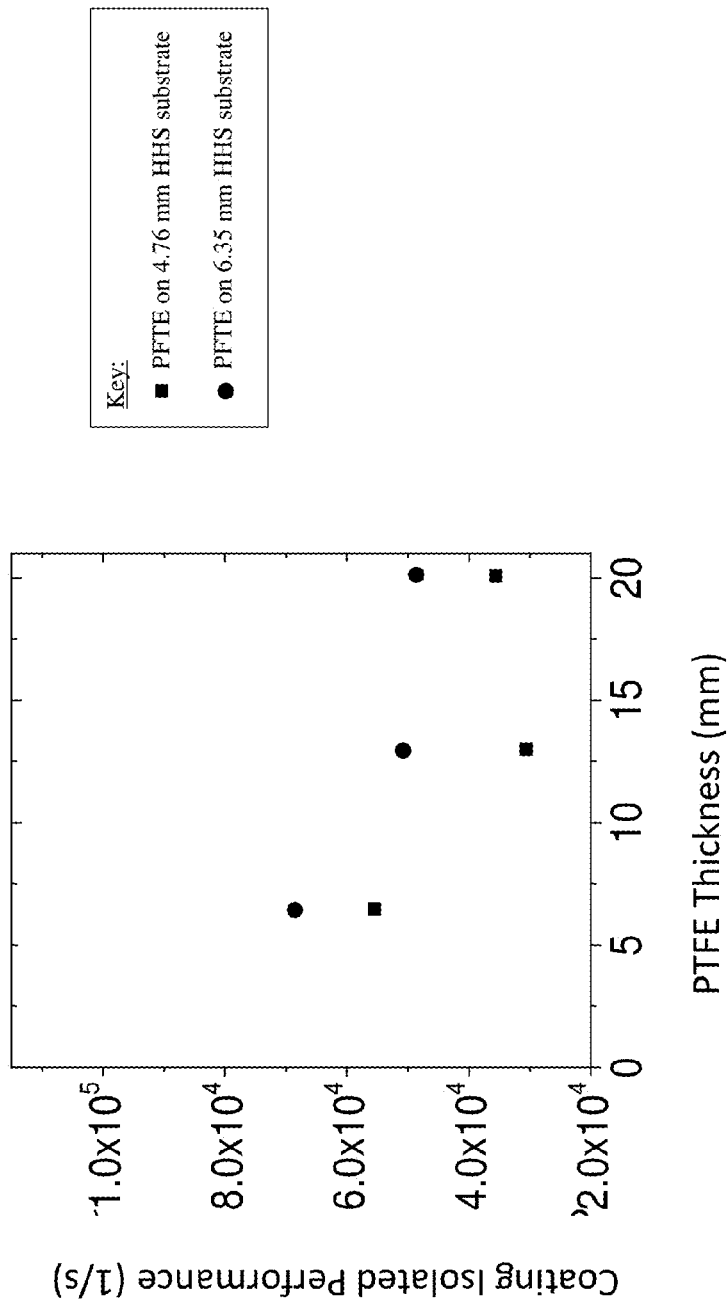
FIG. 5 illustrates Coating Isolated Performance for selected embodiments of the armor system.
Figure 6:
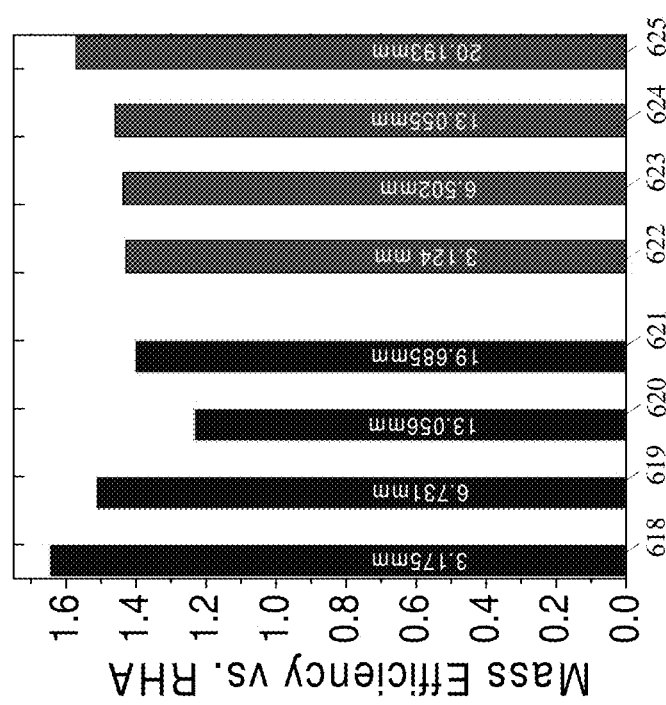
FIG. 6 illustrates Mass Efficiency vs. RHA for selected embodiments of the armor system.

The thinner monolithic coatings demonstrated the most pronounced marginal effect of PTFE front-facing layers on the HHS substrates. As the plots of coating-isolated performance show (FIG. 5), the CIP values for different HHS substrates are similar for 2.3 mm thick coatings but, as PTFE thickness increased, begin to decrease in mass efficiency. In a trend that resembled previous studies using selected polyureas and butyl rubber, PTFE's performance depended on the substrate to which the polymer was applied. The substrate requires both high hardness and high toughness to enable the highest performance of the coating. Typical hardiness for acceptable substrate materials varies between 470 and 600 Brinell. Substrate properties significantly influence the ability to capitalize on the benefits of polymer coatings' penetration resistance performance. The performance of monolithic PTFE coatings over comparable polyurea and other rubber coatings (on both 4.76 and 6.33 mm thick HHS substrates) increased almost threefold. However, the mass efficiency increased at a slower rate, due to the increased density of PTFE over polyurea/rubbers (2.2 g/cm$^3$ vs<1.0 g/cm$^3$). As shown in FIG. 6, most monolithic PTFE coatings yielded mass efficiencies in the 1.40-1.65 region. These values exceed the previously reported 1.31 mass efficiencies for polyurea-coated HHS. At FIG. 6, 618, 619, 620, and 621 represent PFTE coatings of 3.175 mm, 6.731 mm, 13.056 mm, and 19.685 mm respectively on a substrate of 4.75 mm HHS, while 622, 623, 624, and 625 represent PFTE coatings of 3.124 mm, 6.502 mm, 13.055 mm, and 20.193 mm respectively on a substrate of 6.35 mm HHS Performance of PTFE Laminates Laminate samples were manufactured using sequential layers of PTFE sheets followed by 0.05 mm thick Al layers. HMVK polyurea bonded all individual layers and attached the entire coating to the HHS substrate. Each laminate consisted of the PTFE polymer layer (between 0.025 and 2.29 mm thickness), a sheet of aluminum foil (0.050 mm thickness), and a layer of polyurea (HMVK) adhesive (<0.02 mm thick). For each laminate, the number of PTFE layers was one greater than the number of interstitial aluminum foil layers. Similarly, the square size of each target was 30.5 cm×30.5 cm with similar 4.76 and 6.35 mm substrate thicknesses. A small series of PTFE laminate armor systems were studied using a 5.33 mm Ultra-High Hard Steel (UHHS) substrate. The UHHS substrates exhibited an increased rigidity but reduced toughness.

Figure 7:
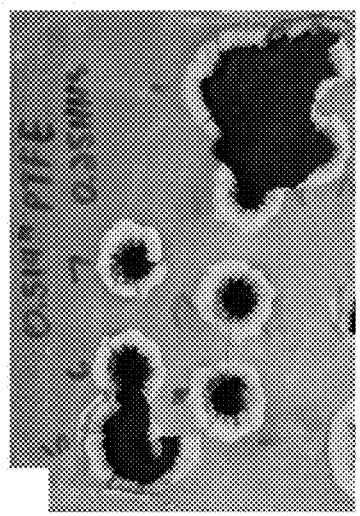
FIG. 7 illustrates exemplary impact for an armor system comprising monolithic PTFE.
Figure 8:
FIG. 8 illustrates exemplary impact for an armor system comprising the composite laminate.

Although the cumulative PTFE layer thickness (from all laminate layers in a single target) matched the thickness of previously described monolithic PTFE coatings, projectile impacts yielded distinct differences in the target response where larger damage areas had been observed. As shown in photographs in FIGS. 7 and 8, larger surface damage areas were observed within laminate PTFE (FIG. 8), as compared to monolithic PTFE targets (FIG. 7). Subsequently, the laminate materials exhibited a larger damaged impact region and suggested increased dissipated kinetic energy. The "petaling" layer morphology within the laminate armor system suggested multiple wave reflections from the impedance mismatch between the PTFE and aluminum layers, Modeling and Hopkinson bar tests have shown that the laminate structure stiffens the polymer layers, which also improves performance.

Figure 9:
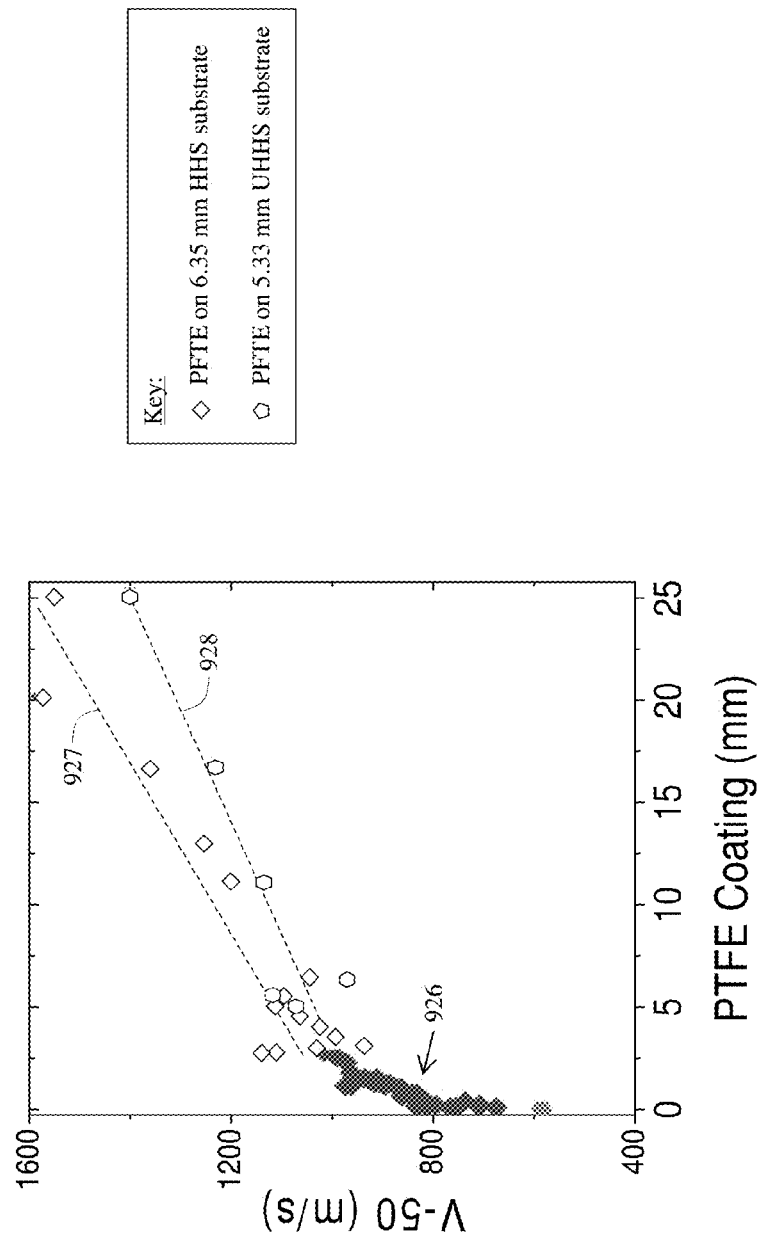
FIG. 9 illustrates further V-50 versus thickness for selected embodiments of the armor system.

FIG. 9 shows the influence of cumulative PTFE laminate thickness on the V-50 performance of 6.35 mm HHS and 5.33 mm thick UHHS polymer-coated targets. Although the ultrathin coatings (<2.5 mm cumulative thickness, indicated generally at 926) demonstrated some variability and did not behave according to definitive trends, most laminate thicknesses demonstrated similar linear trends that linearly increased V-50 of substrates with marginal thicker coatings. The V-50 of 6.35 mm thick HHS increased by 28.1 m/s with each incremental mm thickness of laminate coating, as indicated by trend line 927. This represented a 25% increase over the thickness-dependent V-50 increase of monolithic PTFE coatings on identical 6.35 mm thick HHS substrates and a 365% increase over previously studied polymers and rubbers. The V-50 of 5.33 mm thick UHHS increased by 18.2 m/s with each incremental mm thickness of laminate coating, as indicated by trend line 928.

This finding agrees with similar previous tests of elastomer laminates on rigid substrates. Five key factors influence the penetration resistance performance: polymer transient hardening, energy absorption, energy spreading, impact strain rate reduction, and compression wave reflection. The Al foil layers, which have a different wave velocity (6100 m/s, compared to 1400 m/s for PTFE) and density (2.7 g/cm$^3$, compared to 2.2 g/cm$^3$ for PTFE) than the polymer. This impedance mismatch creates multiple reflections of the incident compression wave as it transmits in front of the projectile. The wave dynamics alter material properties prior to the projectile interaction and reduce the compression waves experienced by the substrate. The specific energy dissipation mechanism, viscoelastic behavior, and flow of the PTFE material during impact will require subsequent in-depth investigations.

Figure 10:
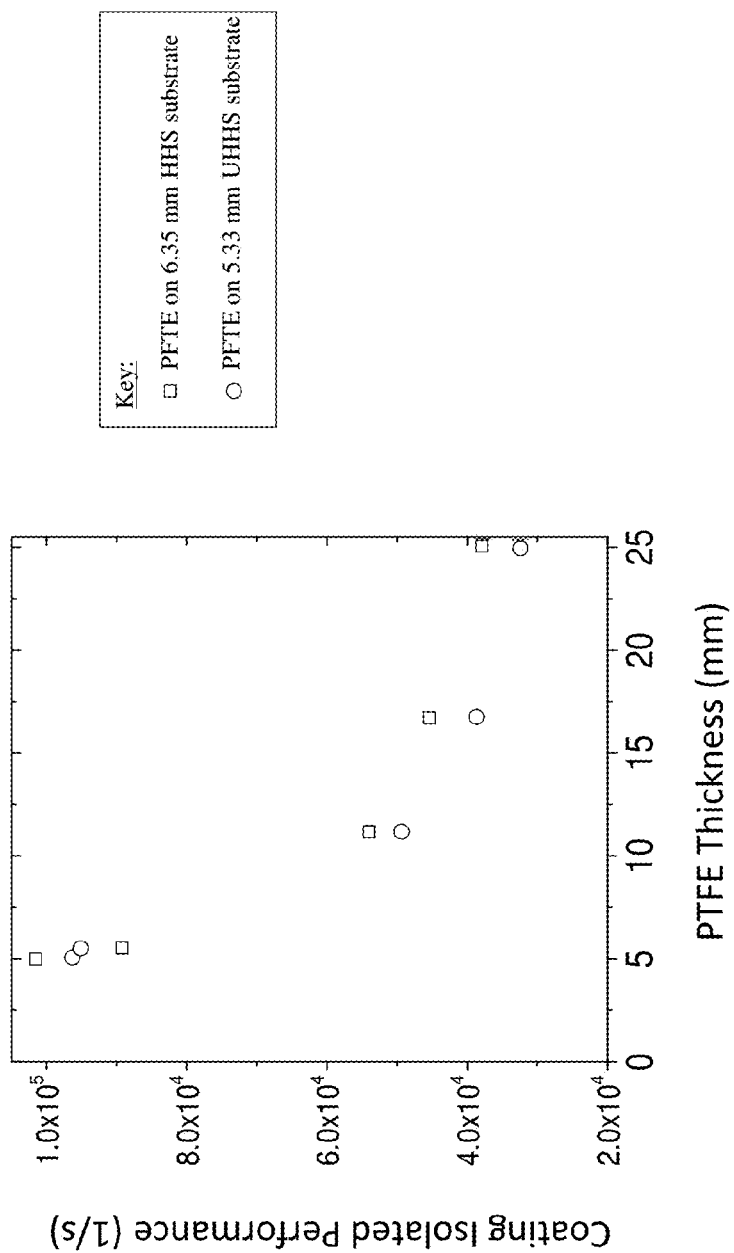
FIG. 10 illustrates further Coating Isolated Performance for selected embodiments of the armor system.

Although the UHHS substrate (600 Brinell) was harder than HHS (470-490 Brinell), the tested samples used thinner layers of the UHHS material. Subsequently, the harder substrate was less rigid. This drawback reduced the marginal benefit of the coatings applied to UHHS but increased the overall mass efficiency for thinner PTFE composite systems (the V-50 of targets covered by PTFE laminates increased by only 18.2 m/s [35% decrease, as compared to similar laminates on 6.33 mm thick HHS]). Furthermore, the OP analysis (FIG. 10) demonstrates a decaying impact of laminate thickness on V-50 of coating layers for both HHS and UHHS substrates, with the former not declining as rapidly as the latter. This result underscores the significance of a sufficiently rigid substrate: the backing material must exhibit both high hardness and sufficient thickness in order to withstand projectile impacts and efficiently use the benefits of front-facing polymer coatings.

Figure 11:
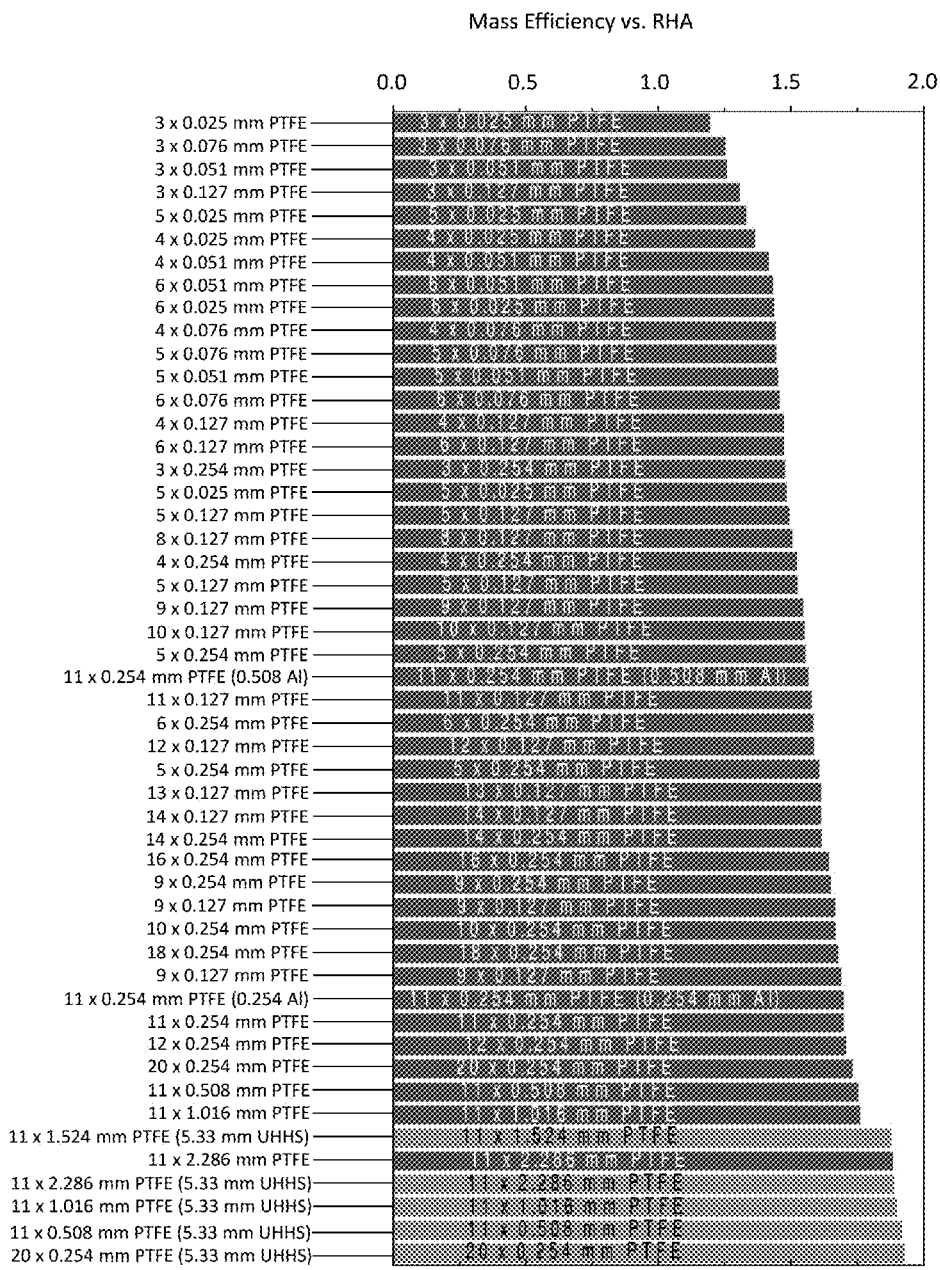
FIG. 11 illustrates Mass Efficiency vs. RHA for multiple embodiments of the armor system.

The comprehensive mass efficiency results for PTFE laminate coatings on HHS and UHHS materials (summarized in FIG. 11) show that PTFE laminates significantly improve the penetration resistance of specific armor grade steel surfaces. At FIG. 11, values are derived from the total areal density of targets and normalized with respect to RHA values of corresponding V-50 values. For each sample, the number of Al foil separating layers was one less than the number of PTFE layers, and the number of HMVK adhesive layers (051 mm thick) equaled the sum of PTFE and Al layers. Unless labeled otherwise, each Al foil layer was 0.051 mm thick. Additionally, the substrate was 6.35 mm HHS unless indicated otherwise. Neither the specific number of layers, nor the thickness of each individual laminate, had independent direct influence on the V-50 of the coated substrate or its mass efficiency. Instead, higher cumulative thickness of the polymer laminates, which exhibited low density, improved the mass efficiency of the armor composites. In particular, UHHS-coated targets demonstrated the highest mass efficiencies that exceeded 1.80. Therefore, despite trade-offs in rigidity in these thin substrates, the exceptional hardness of these materials is a very beneficial property that makes them promising for emerging armor materials.

The results show that PTFE coatings on hard steel substrates significantly improved the penetration resistance of armor composites. Depending on the design, fluoropolymer coatings can provide greater marginal V-50 increases to coated high hard steel than previously tested polymers tested in similar front-facing configurations. PTFE coatings provided the most benefit to hard, rigid, and tough substrates, which required 470-600 Brinell hardness, avoidance of brittle fracture, and sufficient thickness to maintain rigidity. Furthermore, layered PTFE laminates provided greater mass efficiencies than comparably thick monolithic PTFE layers. Isolated V-50 performance benefited most from thin layers, and incremental effects of monolithic and laminated polymer coatings became less apparent at high thicknesses.

The results demonstrated evidence of a previously undiscovered fundamental kinetic energy dissipation mechanism. Unlike previously tested polymer coatings on armor, semicrystalline fluoropolymers were not expected to undergo a glass phase transition during impact.

Thus, provided here is an armor system utilizing a composite laminate comprising a plurality of bi-layers backed by a high hardness substrate. Each bi-layer comprises a first and second layer, where the first layer is a polymer with a density of at least 1.8 g/cm$^3$ and having both amorphous phase and crystalline phases. Further, the polymer has a phase transformation pressure of at least 0.5 GPa at a temperature of 20° C. The second layer of each bi-layer provides acoustic impedance mismatch to generate reflections of the incident compression wave following ballistic impact. The plurality of bi-layers are stacked to form a composite laminate and the composite laminate is backed by a substrate comprising a high hardness material. When armor system experiences a ballistic impact, the polymer undergoes a shock-induced transition resulting in a marked change in microstructure and mechanical behavior. The subsequent plastic deformation and shock-induced flow are very energy-intensive processes and generate a kinetic energy absorption mechanism which outperforms the kinetic impact resistance of polyurea and similar elastomers.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. An armor system comprising a strike face and a back-face, the armor system comprising:
   a composite laminate comprising the strike face, where the composite laminate comprises:
      a plurality of bi-layers, where each bi-layer comprises:
         a first layer, where the first layer comprises a polymer comprising an amorphous phase and a crystalline phase and having a percent crystallinity of greater than 55% and less than 85%, and where the polymer has a phase transformation pressure between the crystalline phase and a second crystalline phase of at least 0.5 GPa at a temperature of 20° C., and where the polymer has a density of at least 1.8 g/cm$^3$, and where the first layer has an impedance $Z_1$, where $Z_1$ is an acoustic impedance of the first layer or a shock impedance of the first layer; and
         a second layer positioned such that the first layer is between the second layer and the strike face, where the second layer has an impedance $Z_2$, where $Z_2$ is an acoustic impedance of the second layer if $Z_1$ is the acoustic impedance of the first layer and $Z_2$ is a shock impedance of the second layer if $Z_1$ is the shock impedance of the first layer, and where $Z_2$ is greater than $Z_1$; and
      one or more adhesive layers where each adhesive layer is adhered to a first layer comprising a first bi-layer in the plurality of bi-layers and adhered to a second layer comprising a second bi-layer in the plurality of bi-layers; and
   a substrate comprising the back-face where the substrate has a Brinell hardness of greater than 400, and where the substrate is positioned such that the composite laminate is between the substrate and the strike face.

2. The armor system of claim 1 where the first layer of the each bi-layer has a thickness of greater than 0.2 mm and less than 2.5 mm.

3. The armor system of claim 2 where the second layer of the each bi-layer has a thickness of greater than 0.01 mm and less than 0.6 mm.

4. The armor system of claim 3 where the substrate has a thickness of greater than 2 mm.

5. The armor system of claim 4 where the composite laminate comprises at least three bi-layers.

6. The armor system of claim 5 where $Z_1/Z_2<0.5$.

7. The armor system of claim 1 where the polymer comprises at least 50 wt. % of the first layer.

8. The armor system of claim 7 where the polymer comprises a fluorinated polymer.

9. The armor system of claim 8 where polytetrafluoroethylene comprises at least 50 wt. % of the fluorinated polymer.

10. An armor system comprising a strike face and a back-face, the armor system comprising:
  a composite laminate comprising the strike face, where the composite laminate comprises a plurality of bi-layers where each bi-layer comprises:
    a first layer comprising a polymer where the polymer comprises at least 50 wt. % of the first layer, where the polymer comprises an amorphous phase and a crystalline phase and has a percent crystallinity of greater than 55% and less than 85%, where the polymer has a phase transformation pressure between the crystalline phase and a second crystalline phase of at least 0.5 GPa at a temperature of 20° C., and where the polymer has a density of at least 1.8 g/cm$^3$, and where the first layer has an impedance $Z_1$, where $Z_1$ is an acoustic impedance of the first layer or a shock impedance of the first layer; and
    a second layer bonded to the first layer and positioned such that the first layer is between the second layer and the strike face, where the second layer has a second impedance $Z_2$, where $Z_2$ is an acoustic impedance of the second layer if $Z_1$ is the acoustic impedance of the first layer and $Z_2$ is a shock impedance of the second layer if $Z_1$ is the shock impedance of the first layer, and where $Z_1/Z_2<0.5$, and where the second layer of the each bi-layer is bonded to a first layer comprising another bi-layer in the plurality of bi-layers; and
  a substrate comprising the back-face where the substrate has a Brinell hardness of greater than 400, and where the substrate is positioned such that the composite laminate is between the substrate and the strike face.

11. The armor system of claim 10 where the composite laminate is bonded to the substrate.

12. The armor system of claim 11 where the composite laminate comprises at least three bi-layers.

13. The armor system of claim 12 where the polymer comprises a fluorinated polymer and the fluorinated polymer comprises at least 75 wt. % of the first layer.

14. The armor system of claim 13 where polytetrafluoroethylene comprises at least 75 wt. % of the fluorinated polymer.

15. The armor system of claim 14 where the first layer of the each bi-layer has a thickness of greater than 0.2 mm and less than 2.5 mm, the second layer of the each bi-layer has a thickness of greater than 0.01 mm and less than 0.6 mm, and the substrate has a thickness of greater than 2 mm.

16. An armor system comprising:
  a substrate comprising a back-face where the substrate has a Brinell hardness of greater than 400, where the substrate is bonded to a composite laminate; and
  a composite laminate comprising a strike face, where the composite laminate consists of a plurality of first layers, a plurality of second layers, and one or more fastening means, where every second layer is between a leading first layer and a following first layer, where the leading first layer is a first layer in the plurality of first layers between the every second layer and the strike face, and where the following first layer is a first layer in the plurality of first layers between the every second layer and the back-face, and where the every second layer is fixably attached to the leading first layer by one of the one or more fastening means and fixably attached to the following first layer by another of the one or more fastening means, such that a projectile coming from a direction D from the strike face to the back face will encounter the leading first layer followed by the every second layer followed by the following first layer, and where:
    each first layer in the plurality of first layers comprises a polymer where the polymer comprises at least 75 wt. % of the each first layer, where the polymer comprises an amorphous phase and a crystalline phase and has a percent crystallinity of greater than 55% and less than 85%, where the polymer has a phase transformation pressure between the crystalline phase and a second crystalline phase of at least 0.5 GPa at a temperature of 20° C., and where the polymer has a density of at least 1.8 g/cm$^3$, and where the each first layer has an impedance $Z_1$, where $Z_1$ is an acoustic impedance of the each first layer or a shock impedance of the each first layer; and
    each second layer in the plurality of second layers comprises a metal, and where the each second layer has a second impedance $Z_2$, where $Z_2$ is an acoustic impedance of the each second layer if $Z_1$ is the acoustic impedance of the each first layer and $Z_2$ is a shock impedance of the each second layer if $Z_1$ is the shock impedance of the each first layer, and where $Z_1/Z_2<0.5$.

17. The armor system of claim 16 where the each first layer in the plurality of first layers has a thickness of greater than 0.2 mm and less than 2.5 mm, and where the each second layer in the plurality of second layers has a thickness of greater than 0.01 mm and less than 0.6 mm, and where the substrate has a thickness of greater than 2 mm.

18. The armor system of claim 17 where the plurality of first layers comprises at least three first layers and where the plurality of second layers comprises at least three second layers.

19. The armor system of claim 18 where the one of the one or more fastening means comprises an adhesive.

* * * * *